(12) United States Patent
Thomas et al.

(10) Patent No.: US 6,248,013 B1
(45) Date of Patent: Jun. 19, 2001

(54) APPARATUS FOR PROCESSING MEAT

(75) Inventors: Randolph L. Thomas, Pasadena, MD (US); Eugene D. Gagliardi, Jr., Atglen, PA (US)

(73) Assignees: AK Robins, LLC, Baltimore, MD (US); Visionary Design, Inc., Atglen, PA (US)

( * ) Notice: Subject to any disclaimer, the term of this patent is extended or adjusted under 35 U.S.C. 154(b) by 0 days.

(21) Appl. No.: 09/409,466

(22) Filed: Sep. 30, 1999

(51) Int. Cl.[7] .................................................. A22C 17/02
(52) U.S. Cl. ............................................ 452/149; 452/138
(58) Field of Search .............................. 452/149, 29, 37, 452/138, 160

(56) References Cited

U.S. PATENT DOCUMENTS

| | | | |
|---|---|---|---|
| 2,291,809 | * | 8/1942 | Jackson ................................. 452/149 |
| 2,981,971 | * | 5/1961 | Zubrychi .............................. 452/141 |
| 3,095,603 | * | 7/1963 | May ...................................... 452/141 |
| 4,580,475 | * | 4/1986 | Antonissen ............................... 83/71 |
| 4,644,729 | * | 2/1987 | Fessler ..................................... 83/90 |
| 5,069,914 | | 12/1991 | Gagliardi, Jr. . |
| 5,286,230 | * | 2/1994 | Nienstedt et al. .................... 452/149 |
| 5,771,771 | | 6/1998 | Gagliardi, Jr. . |
| 5,782,685 | * | 7/1998 | Hazenbroek et al. ............... 452/138 |

* cited by examiner

Primary Examiner—Willis Little
(74) Attorney, Agent, or Firm—Akin, Gump, Strauss, Hauer & Feld, L.L.P.

(57) ABSTRACT

An apparatus for processing a meat including a frame and a driving mechanism attached to the frame. A carriage is attached to the driving mechanism and is movable along a path. The carriage is adapted to support the meat. A cutting head is disposed along the path to cut the meat into at least two pieces of meat when the driving mechanism forces the meat through the cutting head.

18 Claims, 7 Drawing Sheets

APPARATUS FOR PROCESSING MEAT

BACKGROUND OF THE INVENTION

The present invention relates to meat processing equipment and, more specifically, to an apparatus for processing meat into relatively smaller portions.

In the preparation of a variety of meat products, it is useful to process relatively larger portions of meat into smaller portions or strips of meat. Such individual strips of meat can used to form many meat products. For example, the individual strips of meat can be battered, breaded, and fried to form a "fun" to eat french fry type of meat product.

Unfortunately, the slicing of meat into various relatively small portions of meat is a time consuming and tedious process when carried out by hand. More problematic is the inherent danger in using a knife or other sharp cutting device to manually slice a portion of meat, as the knife can easily slip from the meat and cut the hand and/or other parts of the person cutting the meat. Accordingly, a need exists for an apparatus that is capable of safely and rapidly processing portions of meat into multiple smaller pieces of meat.

BRIEF SUMMARY OF THE INVENTION

Briefly stated, the present invention is directed to an apparatus for processing meat. The apparatus includes a frame and a driving mechanism attached to the frame. A carriage is attached to the driving mechanism and is movable along a path. The carriage is adapted to support the meat. A cutting head is disposed along the path to cut the meat into at least two pieces of meat when the driving mechanism forces the meat through the cutting head.

BRIEF DESCRIPTION OF THE SEVERAL VIEWS OF THE DRAWINGS

The foregoing summary, as well as the following detailed description of the preferred embodiments of the invention, will be better understood when read in conjunction with the appended drawings. For the purpose of illustrating the invention, there is shown in the drawings embodiments which are presently preferred. It is understood, however, that the invention is not limited to the precise arrangements and instrumentalities shown. In the drawings.

DETAILED DESCRIPTION OF THE INVENTION

Certain terminology is used in the following description for convenience only and is not limiting. The words "right," "left," "lower," and "uppe" designate directions in the drawings to which reference is made. The words "inwardly" and "outwardly" refer to directions toward and away from, respectively, a geometric center of the apparatus for processing meat and designated parts thereof. The terminology includes the words above specifically mentioned, derivatives thereof and words of similar import. Additionally, the word "a," as used in the specification and in the claims, means "at least one."

Referring to the drawings in detail, wherein like numerals indicate like elements throughout, there is shown in FIGS. 1–19 preferred embodiments of an apparatus for processing meat, generally designated 20. Generally speaking, the apparatus 20 transfers meat 26 onto a carriage 34 and the meat 26 is then driven by movement of the carriage 36 through a cutting head 28. When the meat 26 is driven through the cutting head 28, the meat 26 is cut into at least two but preferably a plurality of pieces of meat 30.

The apparatus 20 preferably processes elongated meat 26 such as hot dogs, worsts, sausages or any other similarly shaped meats. However, those of skill in the art will appreciate from this disclosure that the apparatus 20 can process any type of meat having any shape. Accordingly, depending on the type of meat to be processed and on the particular dimensions of the meat 26 to be processed, the apparatus 20 can be altered using modifications that would be obvious to one of skill in the art when considered in combination with this disclosure and the particular application. Additionally, the apparatus 20 of the present invention can be used with foods, other than meats, having properties, such as texture or cohesion, that are relatively similar to those of meat.

Figure 1:
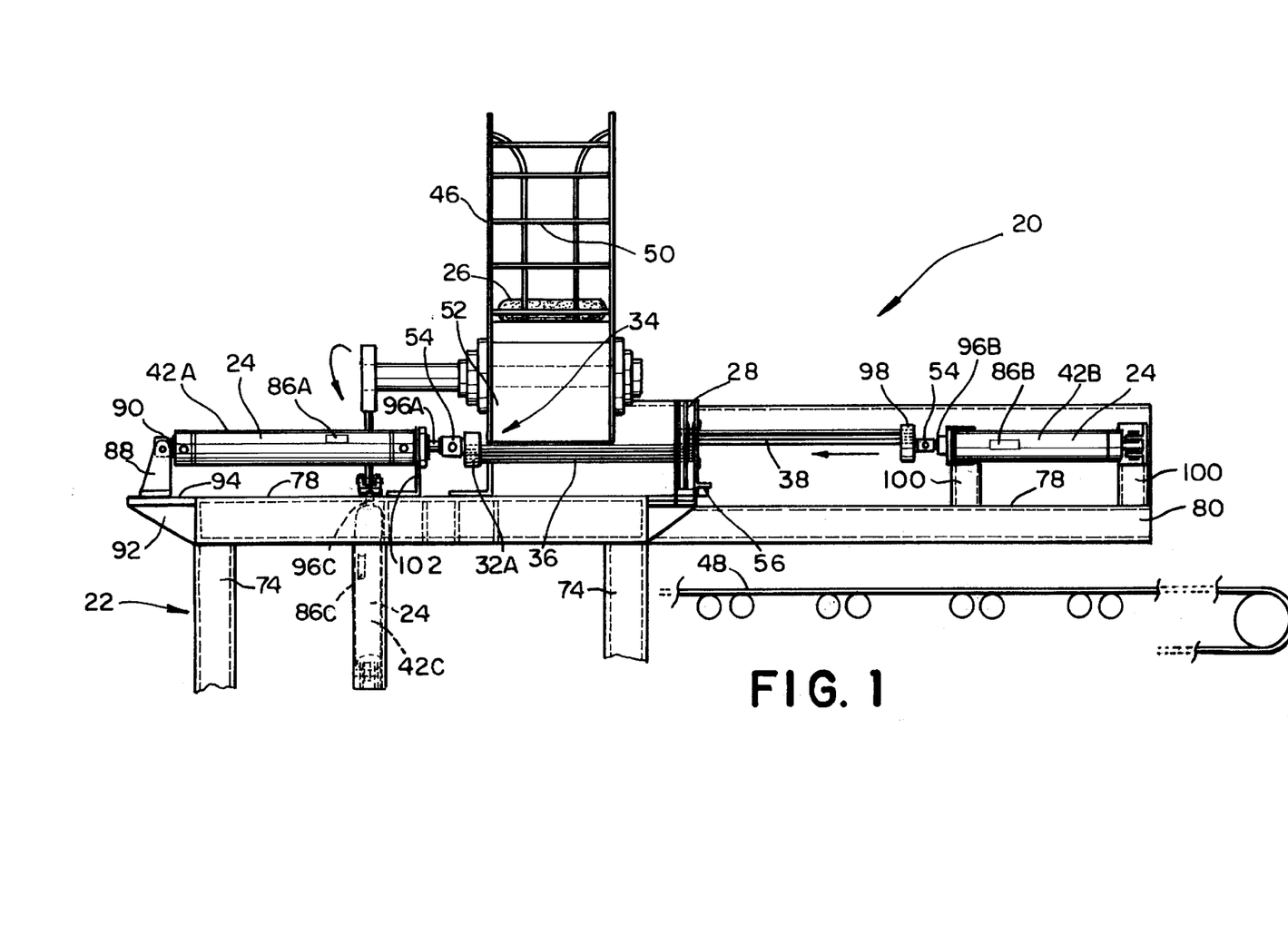
FIG. 1 is a front elevational view of a first embodiment an apparatus for processing meat according to the present invention.
Figure 2:
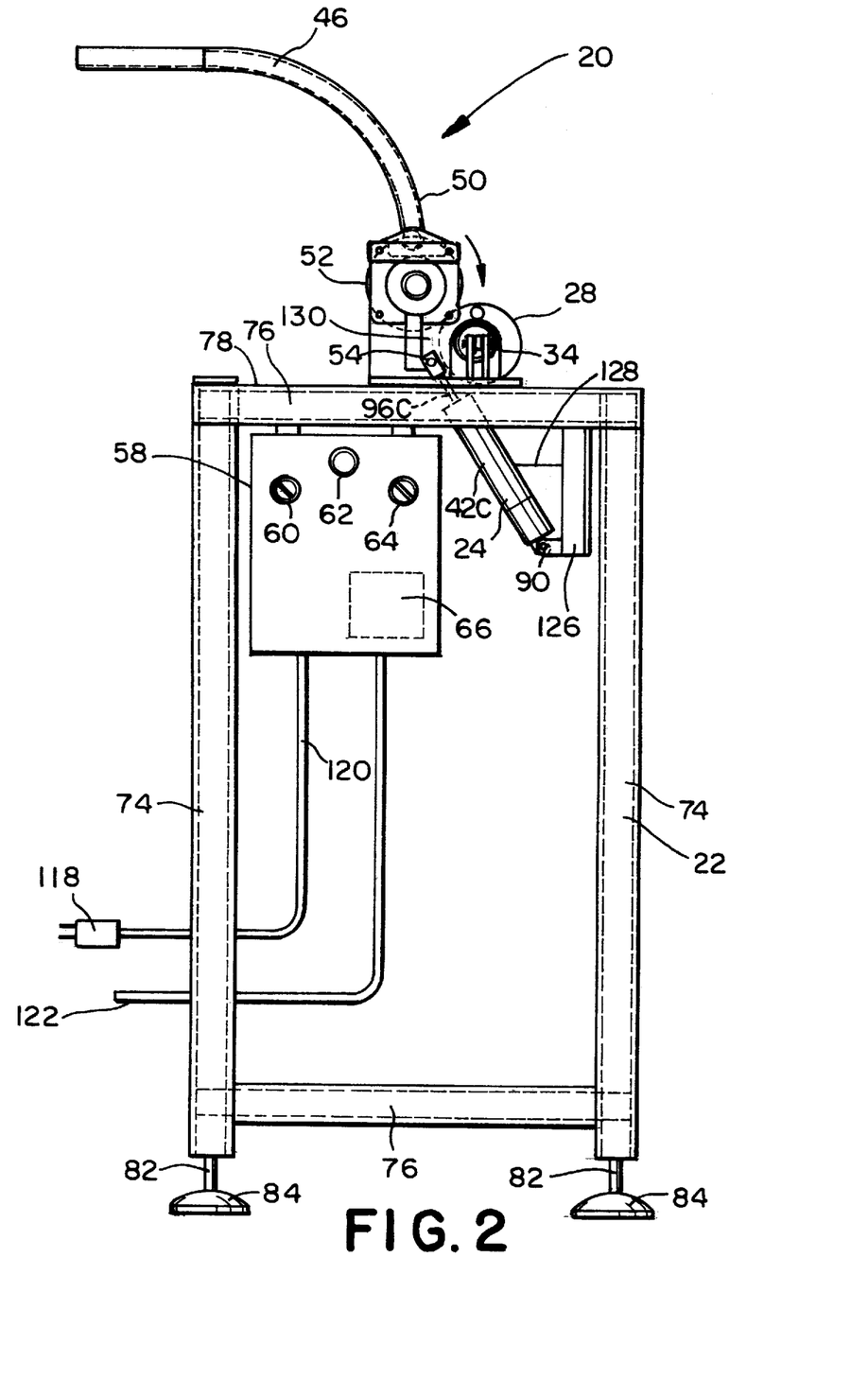
FIG. 2 is a left side elevational view of the apparatus of FIG. 1.
Figure 3:
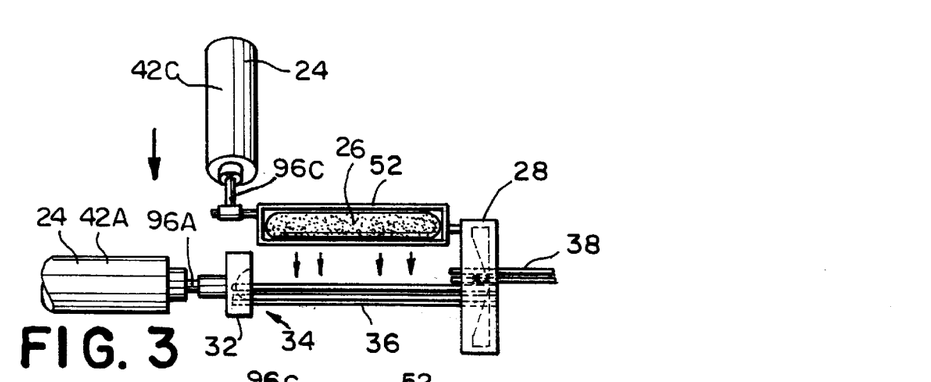
FIG. 3 is a front elevational view of a portion of the apparatus of FIG. 1 as the meat is about to be transferred from a dispensing roller to a lower support of a carriage.

FIGS. 1 and 2 are front and left side elevational views of the apparatus 20 for processing at least one meat 26. The apparatus 20 includes a supporting frame 22. The struts of the frame 22 are preferably formed of square metallic tubes. Unless otherwise stated, each component of the frame 22 is constructed of stainless steel. While it is preferred that the frame 22 be constructed of stainless steel, it is understood by those of skill in the art from this disclosure that any suitably strong, durable, and non-corrosive metal, or alloy or any other suitable material, can be used to form the frame 22 and its component parts.

Referring to FIG. 2, the frame 22 preferably has four vertical struts 74 (only two of which are visible in FIG. 2). Crossbars 76 are used to connect the left and right vertical struts 74 (only one of the crossbars 76 is shown in FIG. 2). The frame 22 also includes a top surface 78 upon which various components of the apparatus 20 are preferably mounted. A hole (not shown) is positioned in the top surface 78 of the frame 22 to allow the third cylinder 42C to operate through the top surface 78 as further detailed below. Referring to FIG. 1, horizontal struts 80 (only one of which is viewable) extend rightwardly from the vertical struts 74 to support the second cylinder 42B as further detailed below. The top surface 78 preferably extends along the horizontal struts 80 with the exception of a second hole (not shown) that is positioned on the right side of the cutting head 28 to allow the pieces of meat 30 to fall past the top surface 78 and onto a conveyor 48 as further detailed below.

Referring to FIG. 2, adjustable feet 84 engage the lower end of each of the vertical struts 74 to support the apparatus 20. The adjustable feet 84 preferably have a stem portion 82 that extends upwardly and engages the lower portion of the vertical struts 74. The adjustable feet 84 are preferably individually adjusted to compensate for differences in the height of the surface supporting the apparatus 20 as is known to those of skill in the art. While the particular configuration of the preferred frame 22 has been described above, those of skill in the art will appreciate from this disclosure that various types of frames 22 can be used without departing from the scope of the present invention. The primary aspect of importance of the frame 22 is that the various components of the apparatus 20 can be supported thereon for the operation of the apparatus 20 as hereinafter described.

Referring to FIGS. 1–7, 15, and 16, a driving mechanism 24 is attached to the frame 22. The preferred driving mechanism uses a plurality of cylinders 42A–42C to drive the various components of the apparatus 20 to process meat 26. A carriage 34 is attached to the driving mechanism 24 and is movable along a path. The carriage 34 is adapted to support the meat 26. The carriage 34 includes a plate 32 which forms a first end of the carriage 34 and a first plurality of spaced apart bars 35 each having an end attached to the plate 32 to form a lower support 36 for the meat 26. The plate 32 preferably has holes (not shown) drilled, or formed, therein prior to attaching the bars 35 which form the lower support 36 of the plate 32. Then, the bars 35 are preferably inserted into the holes of the plate 32 and are seam welded or otherwise secured into position. While it is preferred that the bars 35 are mounted in holes in the plate 32 and then seam welded into place, those of skill in the art will appreciate from this disclosure that various other methods can be used to attach the bars 35 which form the lower support 36 to the plate 32. For example, the bars can be integrally formed with the plate 32 using a molding process as is well known by those of skill in the art when considered in combination with this disclosure.

The carriage 34 includes a second plurality of bars 37 that are extendable above the lower support 36 to form an upper support 38 for the meat 26. The bars that form the upper support 38 are mounted to a second plate 98 in a fashion similar to that of the lower support 36. Thus, the carriage 34 preferably comprises the plate 32, the bars 35 attached to the plate 32 which forms the lower support 36, the second plate 98 and the attached bars 37 which form the upper support 38.

The carriage 34 preferably, but not necessarily, has an elongated shape and is preferably sized and shaped to hold generally elongated, generally cylindrically shaped meats 26 having a diameter of up to about one inch and having a length of up to about six inches. While the apparatus 20 is preferably sized to hold meat having a diameter of about one inch and having a length of about six inches, those of skill in the art will appreciate from this disclosure that the apparatus 20 can be modified to accommodate larger portions of meat 26. The modifications to the apparatus 20 that are necessary to increase the size of the meats 26 processed by the apparatus 20 would be well known to those of skill in the art when considered in combination with this disclosure.

The lower support 36 is preferably formed using five elongated, generally cylindrical steel bars 35. However, those of skill in the art will appreciate from this disclosure that the number of bars 35 used to form the lower support 36 is not critical to the present invention. Those of skill in the art will also appreciate from this disclosure that it is not critical to the present invention that the bars 35 be formed of steel. Accordingly, any size, shape or number of bars 35 can be used to form the lower support 36 provided that the lower support 36 is able to provide the necessary support for the meat so that the meat may properly penetrate through the bore 106 in the cutting head 28 as hereinafter described. One important aspect of the lower support 36 is that the lower support 36 have the equivalent of slots therein (which are formed in the preferred embodiment of the lower support 36 by the spaces between the bars) to allow the lower support to pass through the cutting head 28 (further detailed below). Accordingly, referring to FIG. 17 and 18, the carriage 34 can be formed using a plate 32 to form an end of the carriage and a base plate 132 bearing at least one slot 134 that is attached to the plate 32 to form a lower support 36 for the meat 26.

The length of the bars comprising the lower support 36 is preferably such that when the lower support 36 of the carriage 34 is positioned at its leftmost point (as shown in FIG. 1), the right ends of the bars terminate approximately at the right end of the cutting head 28. Such a length of the lower support 36 is preferable because it encourages any processed meat which remains on the lower support 36 of the carriage 34 after the slicing operation to fall from the carriage 34 when the lower support 36 is at its leftmost position, as further detailed below.

Figure 16:
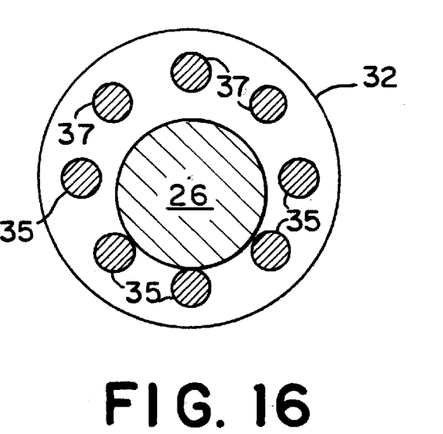
FIG. 16 is a cross-sectional view of the lower support of FIG. 15 and the first embodiment of the upper support of FIG. 5 as taken along the line 16—16 in FIG. 5.
Figure 17:
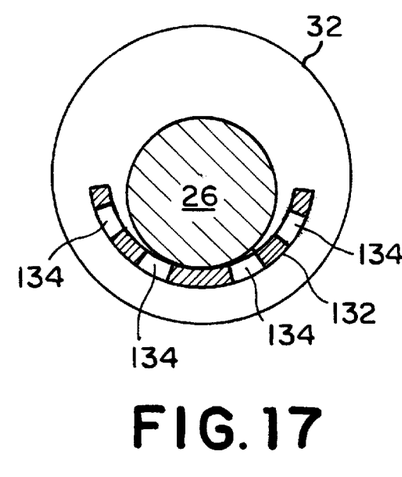
FIG. 17 is a cross-sectional view similar to that of FIG. 15 illustrating a second embodiment of a lower support.
Figure 18:
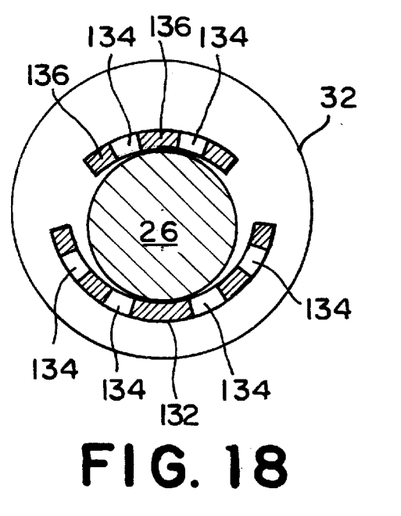
FIG. 18 is a cross-sectional view similar to that of FIG. 16 illustrating the lower support of FIG. 17 and a second embodiment of the upper support.

Referring to FIG. 16, the upper support 38 is preferably formed using three elongated, generally cylindrical steel bars 37 which are mounted to the second plate 98 in a fashion similar to that of the bars of the lower support 36. The bars 37 that comprise the upper support 38 extend leftwardly from the second plate 98 and are generally parallel to the path followed by the meat 26 as the meat 26 is driven from one side of the cutting head 28 to the other side of the cutting head 28. While the upper support 38 is preferably formed using three cylindrical steel bars 37, those of skill in the art will appreciate from this disclosure that any number, size or shape of steel bars may be used to form the upper support 38, as long as the support finction described below is adequately met. An important aspect of the upper support 38 is that the upper support 38 should be capable of penetrating through the bore 106 in the cutting head 28 as hereinafter described. While the upper support 38 is preferably formed of steel bars, those of skill in the art will appreciate that the upper support 38 is not limited to being constructed of bars. For example, referring to FIG. 18, the upper support 38 can be formed by a top plate 136 that is positionable above the base plate 132 and that has at least one slot 134.

The upper support 38 preferably has a length such that when the upper support 38 is at its rightmost position, the left end of the upper support 38 terminates approximately at the left end of the cutting head 28 as viewed in FIG. 1. Such construction is preferable to facilitate the falling of the meat 26 from a dispensing roller 52 onto the carriage 34 without interference from the upper support 38, as further detailed below.

Referring to FIGS. 1 and 3–7, the driving mechanism 24 includes a first cylinder 42A attached to the frame 22 and having an end attached to either one of the plate 32 and the lower support 36 of the carriage 34 to reciprocatingly drive the lower support 36 along a generally straight path. Referring to FIG. 1, the path extends generally linearly along the path traveled by the lower support 36 from the point where the meat 26 first contacts the lower support 36 to the point where the meat is completely forced through the cutting head 28 and then falls from the lower support 36.

Referring to FIGS. 1 and 3–7, the first cylinder 42A is positioned on the left end of the apparatus 20. The first cylinder 42A is attached to a pillow block 88 using a fastener 90. Referring to FIG. 1, a triangularly-shaped flange 92 is attached to the upper left corner of the frame 22. The triangularly-shaped flange 92 tapers as it projects leftwardly from the frame 22 and has an upper surface 94 that is generally coaligned with the top surface 78 of the frame 22. The upper surface 94 of the triangularly shaped flange 92 supports the pillow block 88 to which the first cylinder 42A is connected. The first cylinder 42A is generally parallel to the top surface 78 of the frame 22 and is coaligned with the path traveled by the carriage 34.

Referring to FIG. 1, the right end of the first cylinder 42A is supported by a bracket 102 which is braced against the top surface 78 of the frame 22. It is preferable that the first cylinder 42A is positioned so that while the first rod 96A is completely retracted, the rightmost ends of the lower support 36 are not completely disengaged from the cutting head 28. A fastening pin 54 is used to connect the distal end of the first rod 96A which extends from the right side of the first cylinder 42A to either the plate 32 or to the lower support 36 of the carriage 34. FIG. 1 illustrates the first rod 96A of the first cylinder 42A in its completely retracted state.

A second cylinder 42B is attached to the frame 22 and has an end attached to the upper support 38 of the carriage 34 to reciprocatingly drive the upper support 38 along a generally straight path. The second cylinder 42B is attached to mounting struts 100 which are positioned along the right end of the top surface 78 which is supported by the horizontal struts 80. The mounting struts 100 are attached to the right and left ends of the second cylinder 42B as viewed in FIG. 1. Referring to FIG. 2, both the first and second cylinders 42A, 42B are preferably placed proximate to the center of the top surface 78 as measured along the width of the frame 22.

A second rod 96B extends from the left side of the second cylinder 42B as viewed in FIG. 1. The second rod 96B is attached to the second plate 98 via a fastening pin 54. The second cylinder 42B is generally parallel to the top surface 78 of the frame 22. FIG. 1 illustrates the second rod 96B of the second cylinder 42B in its most retracted state. It is preferable that the second cylinder 42B is positioned so that while the second rod 96B is completely retracted, the leftmost ends of the upper support 38 of the carriage 34 are not completely disengaged from the cutting head 28.

While a preferred method of mounting the first and second cylinders 42A, 42B has been described, those of skill in the art will appreciate from this disclosure that the present invention is not limited to any particular method of mounting the first and second cylinders 42A, 42B. The primary aspect of importance of the structure used to support the first and second cylinders 42A, 42B is that the first and second cylinders 42A, 42B are maintained in positions that allow the carriage 34 to properly travel along the path to force the meat 26 through the cutting head 28.

It is preferable that the first cylinder 42A and the second cylinder 42B are each pneumatic cylinders. More specifically, it is preferred that the first and second cylinders 42A, 42B have a stroke length of approximately 12 inches and are operable using air supplied at a pressure of about 125 pounds per square inch. While it is preferable that the portions of the driving mechanism 24 that reciprocatingly drive the lower carriage 36 and the upper carriage 38 include pneumatic air cylinders, those of skill in the art will appreciate from this disclosure that the present invention is not limited to an apparatus 20 using pneumatic cylinders to manipulate the lower support 36 and the upper support 38. For example, hydraulic cylinders could be employed or internal combustion engines or electric motors may be used to drive the lower support 36 and the upper support 38. Accordingly, those of skill in the art will appreciate from this disclosure that an important aspect of the above-detailed portion of the drive mechanism 24 is that the drive mechanism 24 is capable of reciprocatingly driving the lower support 36 and the upper support 38. It is also understood by those of skill in the art that the specific dimensions, and operating pressures of the first and second cylinders 42A and 42B can be modified without departing from the scope of the present invention. The modifications to the apparatus 20 necessary to use first and second cylinders 42A, 42B having characteristics different from those mentioned above would be known to those of skill in the art when considered in combination with this disclosure.

Figure 8:
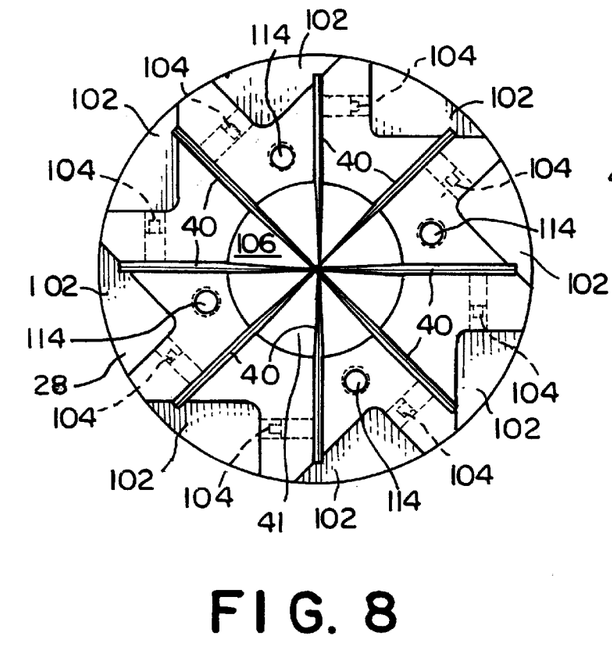
FIG. 8 is a front cross-sectional view of the preferred embodiment of the cutting head of the apparatus of FIG. 1.
Figure 9:
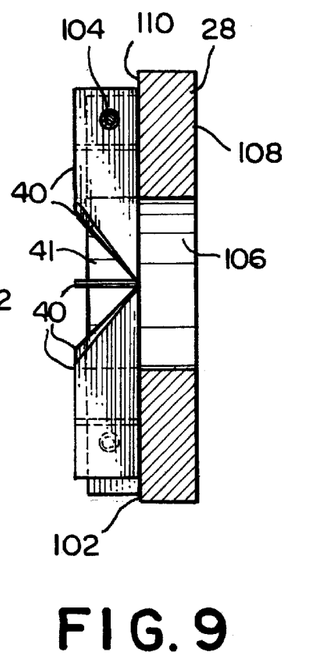
FIG. 9 is an elevational cross-sectional view of the cutting head of FIG. 8.

The cutting head 28 is disposed along the path of movement of the carriage 34 to cut the meat 26 into at least two pieces of meat 30 when the driving mechanism 24 forces the meat 26 through the cutting head 28. Referring to FIGS. 8 and 9, bores 114 are preferably placed in the preferred embodiment of the cutting head 28 to facilitate the mounting of the cutting head 28 to the apparatus 20. The cutting head 28 is preferably formed using eight generally equally circumferentially spaced blades 40 which are preferably securely but removably attached to the cutting head 28 using pins, or set screws, 104. Eight grooves 102 have a substantially triangular shape and are generally equally spaced about the circumference of the cutting head 28. The grooves 102 facilitate access to the pins 104 and are preferably about one half inch deep.

Gaps 41 remain in the portions of the bore 106 of the cutting head 28 that are not occupied by the blades 40. The bars 35 of the lower support 36 and the bars 37 of the upper support 38 penetrate the bore 106 of the cutting head 28 by extending through the gaps 41. Thus, the lower and upper supports 36, 38 are aligned so that the bars (or the top and bottom plates 132, 136 mentioned above) will pass through the gaps 41 without engaging or damaging the blades 40. This allows the lower and upper supports 36, 38 to extend through the cutting head 28 to process the meat 26 into the smaller pieces of meat 30.

To fasten the blades 40 to the cutting head 28, the blades 40 are preferably inserted into slots 138 in the cutting head as shown in FIG. 8. Then, pins, or set screws, 104 are inserted laterally through the cutting head 28. The set screws 104 are inserted from a lateral surface of the cutting head 28 formed by a groove 102 and are threaded into the cutting head until the blade 40 is securely braced within the slot 138. The set screws 104 are used to press the blades 40 against the side of the slot 138 opposite from the respective set screw 104. Thus, the set screws 104 detachably secure the blades 40 in the slots 138. Referring to FIG. 9, the openings 112 in the blades 40 are due to the process typically used to manufacture the blades 40 and do not constitute part of the present invention. However, those of skill in the art will appreciate from this disclosure that the openings 112 in the blades 40 can be used in conjunction with the above blade securing method, or any other blade securing method, to further secure each respective blade 40 by engaging the corresponding opening 112 without departing from the scope of the present invention. The cutting head 28 has a base 108 that is counterbored to form a recess 110 against which the blades 40 are preferably braced. Each of the blades 40 is preferably sized such that the blade 40 extends from a point proximate to the circumferential edge of the base 108 to a point proximate to the center of the base 108.

As shown in FIG. 8, the cutting head 28 detachably supports at least one blade 40 and is adapted to be penetrated by the first plurality of bars and the second plurality of bars of the carriage 34. The blades 40 preferably have a generally trapezoidal-shape and are tapered as they extend toward the center of the base 108.

While it is preferable that the blades 40 have a generally trapezoidal-shape and that the blades 40 are tapered as they extend toward the center of the base 108 (which is coaligned with the center of the bore 106 that extends through the base 108), those of skill in the art will appreciate from this disclosure that the shape of the blades 40 can be altered without departing from the scope of the present invention. For example, it is not critical to the present invention that the blades 40 taper to a point as shown in FIG. 9. It is preferable that the cutting head 28 detachably support six blades each having an end disposed proximate to the center of the cutting head 28. It is more preferable that the cutting head 28 detachably support eight blades 40 each having an end disposed proximate to the center of the cutting head 28 as shown in FIG. 8. However, it is understood by those of skill in the art from this disclosure that the cutting head 28 could support a greater or lessor number of blades. For example, the cutting head 28 may support one, three, ten, twelve or sixteen or more blades.

Figure 19:
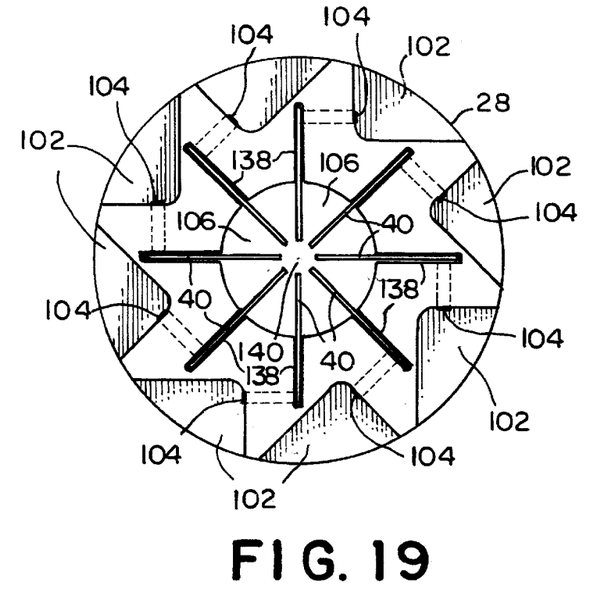
FIG. 19 is a front cross-sectional view of the cutting head of FIG. 8 illustrating the blades positioned to generate meat having a multitude of cuts and an uncut central core.

Referring to FIGS. 8–11, while it is preferable that the blades 40 extend to a point proximate to the center of the cutting head 28, those of skill in the art will appreciate from this disclosure that the blades 40 can be otherwise arranged without departing from the scope of the present invention. Referring to FIG. 19, the blades 40 can be positioned in the slots 138 so that the blades extend only part of the way toward the center of the cutting head 28. The resultant gap 140 that is formed between the ends of the blades 40 results in the processed meat 26 having a plurality of slices extending lengthwise along the meat while leaving an uncut central core of meat material. The use of pins, or set screws, 104 allows the blades to be easily adjusted between a position that generates meat having an uncut central core (shown in FIG. 19) and a position that generates pieces, or strips, of meat 30 (shown in FIGS. 8–11). When a portion of meat 26 is cooked that has a plurality of lengthwise slits and an uncut central core, the longitudinal segments formed by the cuts tend to expand and generate a product that has a central core with multiple longitudinal segments extending outwardly therefrom. The longitudinal segments allow one to separate a portion of meat from the rest of the meat by biting through only the width of one segment of meat. Biting through only the lateral width of a segment of meat requires less effort and results in the removal of a smaller portion of meat than that which would be removed by biting through the entire lateral width of an uncut portion the meat. Thus, the cutting head 28 illustrated in FIG. 19 results in a processed meat that has a reduced likelihood of choking. The above-described processed meat with an uncut core is used to create a food product disclosed in U.S. Pat. No. 5,069,914 which is hereby incorporated by reference herein in its entirety.

The blades 40 are preferably formed of hardened stainless steel similar to that used in scalpel blades and have a thickness of approximately three hundredths of an inch. While it is preferable that the blades 40 are formed of hardened stainless steel having a thickness of approximately three hundredths of an inch, those of skill in the art will appreciate from this disclosure that the particular material and thickness of the blades 40 can be varied depending upon the properties of the particular meat 26 being sliced and depending upon the force with which the meat 26 is driven through the cutting head 28.

The base 108 of the cutting head 28 is preferably formed of stainless steel. However, those of skill in the art will appreciate from this disclosure that the base 28 can be formed of any material exhibiting suitable strength and anticorrosive properties. For example, referring to FIGS. 10 and 11, a second embodiment of the cutting head 28' can be formed of an ultra high molecular weight polymeric material. This type of polymer has been approved by the Food and Drug Administration for use in food preparation processes due to its durability and capability to withstand bleaching and other sanitation procedures.

When using a cutting head 28' formed of ultra high molecular weight polymer it is preferable to use a press fit attachment method to eliminate the use of set screws 104. The ultra high molecular weight polymer cutting head 28' which is used with the press fit method is preferably formed of with slots 138 in a face of the cutting head. Then the blades 40' are preferably aligned with the slots and press fit into position. After the blades 40 are pressed into the cutting head a second layer, piece, slab, covering or the like of ultra high molecular weight polymer is placed over the side of the cutting head 28 that the blades 40 were pressed into and secured thereto. This secures the blades 40 in position while eliminating the use of set screws 104.

Alternatively, the blades 40' used with the ultra high molecular weight polymer cutting head 28' can be embedded in the base 108' of the cutting head 28' itself when the cutting head 28 is formed to eliminate the use of set screws 104. Similar to the cutting head 28 with detachable blades 40 shown in FIGS. 8 and 9, the blades 40' of the second cutting head 28' are tapered as they extend toward the center of the bore 106' in the cutting head 28'. The blades 40' used with the second cutting head 28' are also preferably formed of hardened stainless steel and have a width of approximately three hundredths of an inch. However, the blades 40' used with the second embodiment of a cutting head 28' have a more elongated shape with an outer end 116 that extends past the circumferential edge of the base 108'. Additionally, it is understood by those of skill in the art through this disclosure that the blades 40' used with the ultra high molecular weight polymer cutting head 28' can be positioned to create a gap similar to that shown in FIG. 19 to generate processed meat having an uncut core connecting a plurality of longitudinal segments.

While the bore 106 of the cutting head 28 shown in FIGS. 8 and 9 is generally circularly shaped, those of skill in the art will appreciate from this disclosure that the bore 106 is not limited to having a generally circular shape. For instance, referring to FIGS. 10 and 11, the bore 106' in the cutting head 28' has a multi-sided shape.

Figure 10:
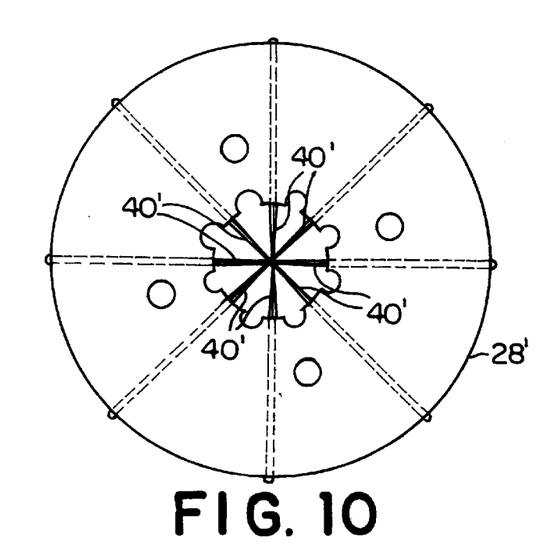
FIG. 10 is a front cross-sectional view of a second embodiment of a cutting head for use with the apparatus of FIG. 1.
Figure 11:
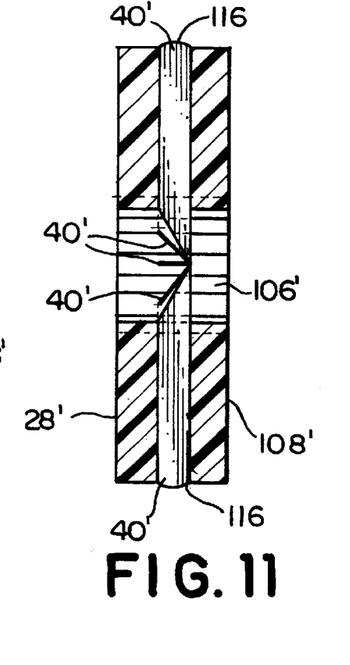
FIG. 11 is a side cross-sectional view of the cutting head of FIG. 10.

The cutting heads 28, 28' shown in FIGS. 8 and 10 preferably have a diameter of about four inches. Additionally, the cutting heads 28, 28' shown in FIGS. 9 and 11 preferably have a thickness of about one inch. However, those of skill in the art will appreciate from this disclosure that the preferred dimensions of the cutting heads 28, 28' can be altered depending upon the expected size of the meat 26 that will be processed by the apparatus 20. The changes to the apparatus 20 necessary to accommodate cutting heads 28, 28' of various sizes would be well known when considered in combination with this disclosure. Furthermore, those of skill in the art will appreciate from this disclosure that the shape of the cutting heads 28, 28' can be modified depending on the shape of the meat that will be processed by the apparatus 20. For example, the shape of the cutting heads 28, 28' can be oblong, square, polygonal, hexagonal, triangular, etc. without departing from the scope of the present invention.

Figure 12:
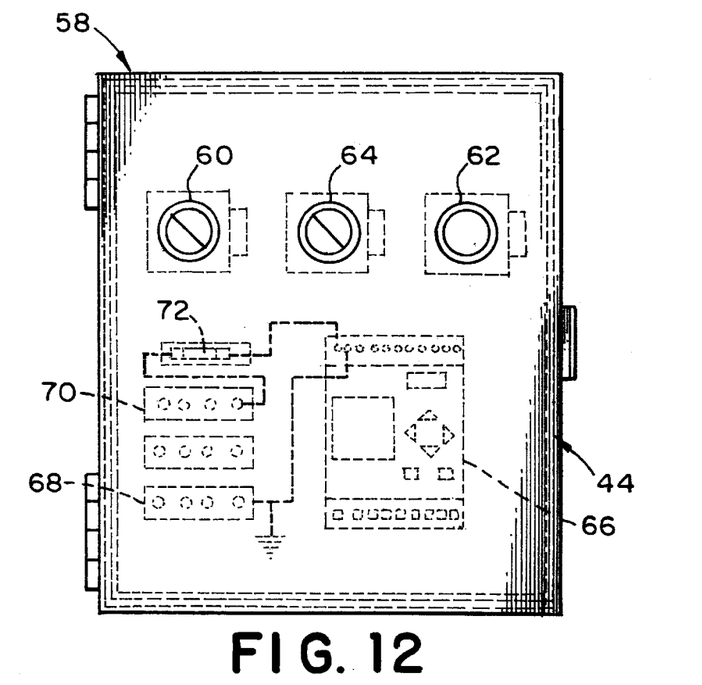
FIG. 12 is a front elevational view of the control unit housing of the apparatus of FIG. 1.
Figure 13:
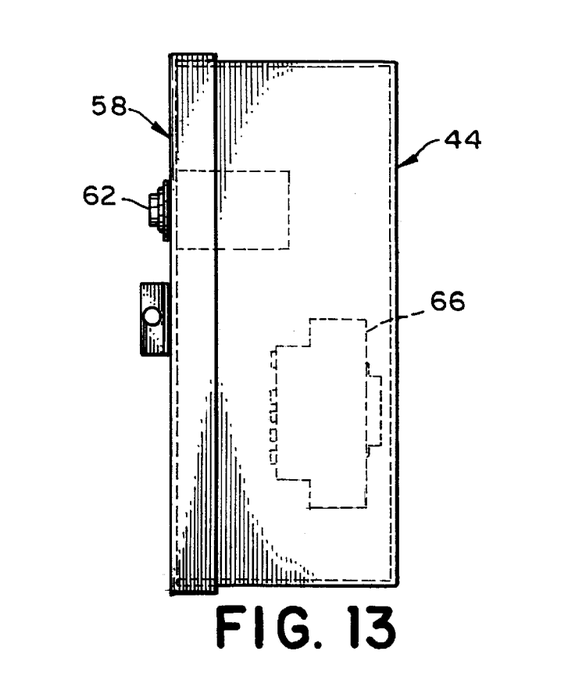
FIG. 13 is a right side elevational view of the control unit housing of FIG. 12.

Referring to FIGS. 2, 12, and 13, a control unit 66 controls the motion of the first cylinder 42A and the second cylinder 42B (as well as the third cylinder 42C which is detailed below). The control unit 66 preferably includes a LOGO 4×6 microprocessor controller that receives power via a socket 118 and a power cable 120. While the control unit 66 is preferably a LOGO 4×6 controller, those of skill in the art will appreciate from this disclosure that the control unit 66 can be a microprocessor of another design. The control unit 66 controls the air flow from a pressurized air supply through a pressure line 122 to regulate the motions of the first through third rods 96A–96C of the first through third cylinders 42A–42C.

The control unit 66 is preferably contained within a control unit housing 58 that is preferably attached to the frame 22 of the apparatus 20. However, those of skill of the art will appreciate from this disclosure that it is not necessary that the control unit 66 be mounted on the frame 22. An important aspect of the control unit 66 is that the control unit 66 is able to regulate the flow of pressurized air to the first through third cylinders 42A–42C and that the control unit 66 be able to receive signals from sensors 86A–86C, which are further detailed below. The control unit housing 58 bears an on/off power switch 60 (which controls the power supplied to the apparatus 20), a single-cycle or continuous-cycle switch 64, and a start button 62. The single or continuous-cycle switch 64 allows an operator to operate the apparatus 20 through a single slicing operation or to continuously operate the machine though repetitive slicing operations. When the apparatus 20 is operated in the continuous cycle mode, the apparatus 20 preferably has a throughput of approximately 34 slicing operations per minute or approximately two thousand slicing operations per hour. However, those of skill in the art will appreciate from this disclosure that the throughput of the apparatus 20 can be adjusted using modifications which are well known to those of skill in the art when considered in combination with this disclosure. Additionally, the control unit housing 58 preferably encloses a grounded bus 68, a one hundred ten volt alternating current bus 70, and an in line fuse 72.

Referring to FIGS. 1 and 2, a hopper 46 is attached to the frame 22 for supporting meat 26. The hopper 46 has a stainless steel bounce guard 50 that prevents the meat 26 from falling out of alignment while the product hopper 46 sequentially feeds the meat 26 to the apparatus 20.

The hopper 46, as viewed in FIG. 2, preferably has a banana clip shape and uses gravity feed to advance the meat 26 during the feeding process. The hopper 46 preferably holds about two and one half pounds of meat 26. However, those of skill in the art will appreciate from this disclosure that the hopper 46 can be varied without departing from the scope of the present invention. For example, the hopper 46 can use a conveyor feed, can have a different shape, can be designed to hold larger amounts of meat 26, and can be designed without the use of the stainless steel bounce guard 50.

A dispensing roller 52 is rotatably mounted to the frame 22 and is adapted to, while in the first position, receive meat 26 from the hopper 46 and is also adapted to, while in a second position, transfer the meat to the carriage 34. The dispensing roller 52 is preferably formed of ultra high molecular weight material and moves through approximately ninety degrees of rotation using a Ferris wheel configuration to alternatingly receive meat 26 and then discharge meat 26. While the preferred embodiment of the apparatus 20 uses a dispensing roller 52, those of skill in the art will appreciate from this disclosure that the functions provided by the dispensing roller 52 can be integrated into the hopper 46 and thus, the dispensing roller 52 can be eliminated without departing from the scope of the present invention.

A third cylinder 42C is attached to the frame 22 and is adapted to rotate the dispensing roller 52 between the first and second positions. Referring to FIG. 2, an L-shaped strut 126 is mounted to the underside of the top surface 78 of the frame 22. The L-shaped strut 126 supports the rightmost end of the third cylinder 42C which is attached via a fastener 90. A second portion of the third cylinder 42C is supported by a bracket 128 which attaches a second portion of the third cylinder 42C to a second portion of the L-shaped strut 126 located above the portion of the L-shaped strut 126 that supports the other end of the third cylinder 42C. Thus, the third cylinder 42C is mounted to the frame 22 in an angled position below the top surface 78 as viewed in FIG. 2.

A third rod 96C is connected to a stroke arm 130 of the dispensing roller 52 via a fastening pin 54. Thus, by extending and retracting the third rod 96C, the dispensing roller 52 is pivoted through a range of about ninety degrees in a reciprocating fashion to both receive and discharge meat pieces 26. Referring to FIG. 2, the third cylinder 42C is shown with the third rod 96C in the completely retracted position. While the preferred method of reciprocatingly driving the dispensing roller 52 is to use a pneumatic cylinder 42C having properties similar to that of the first and second cylinders 42A, 42B, those of skill in the art will appreciate from this disclosure that the particular portion of the driving mechanism 24 which operates the dispensing roller 52 is not limited to using pneumatic cylinders. For example, a hydraulic cylinder, an internal combustion engine or an electric motor can be used to reciprocatingly operate the dispensing roller 52. The primary aspect of importance of this portion of the driving mechanism 24 is that it reciprocatingly drives the dispensing roller 52.

Referring to FIG. 1, a conveyor 48 is disposed underneath a portion of the path of the carriage 34 to receive the pieces of meat 30 after the meat 26 has been sliced by the cutting head 28. The hole in the top surface 78 of the frame 22 that the pieces of meat 30 fall through is positioned on the right side of the cutting head 28. The force of the fall of the pieces of meat 30 onto the conveyor 40 separates the sliced pieces of meat 30 in preparation for further processing. Preferably the conveyor is a vibratory conveyor that accurately separates the individual slices or pieces of the meat 26 to allow the pieces of meat 30 to preferably be directly transferred through sequential battering, breading, and cooking stations. While it is preferable to use a conveyor 48 with the apparatus 20, those of skill in the art will appreciate from this disclosure that the apparatus 20 of the present invention is not limited to including a conveyor 48. Instead, the meat pieces 30 could be collected in a container for later transport.

Figure 14:
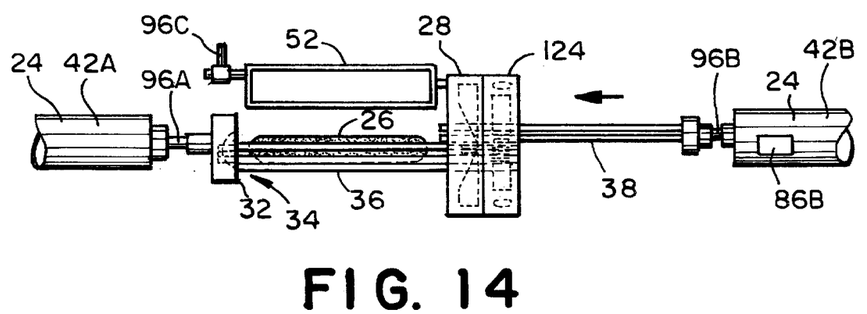
FIG. 14 is a front elevational view of a portion of a second embodiment of an apparatus for processing meat according to the present invention that uses two cutting heads which are coaligned.
Figure 15:
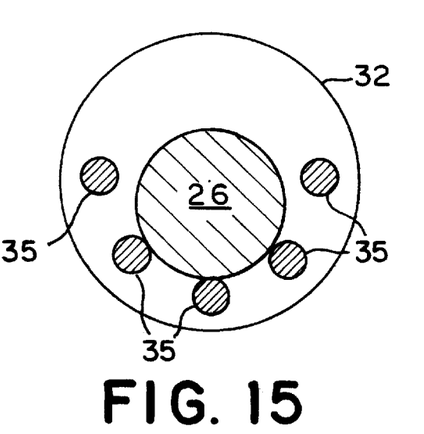
FIG. 15 is a cross-sectional view of the first embodiment of the lower support of the carriage of FIG. 4 as taken along the line 15—15 of FIG. 4.

Referring to FIG. 14, a second embodiment of an apparatus for processing meat according to the present invention uses a second cutting head 124 that is coaligned with the first cutting head 28 to increase a number of pieces of meat generated by the forcing of the meat 26 through both the first cutting head 28 and the second cutting head 124. The number of slices or pieces of meat 30 is increased due to the blades 40 of each of the cutting heads 28, 124 being angularly offset from each. By using a second head 124, the apparatus 20 can generate twice the number of slices or pieces of meat 30 that would be obtained using a single cutting head 28. The view shown in FIG. 14 is similar to that of FIG. 4 (discussed below) in which the meat 26 has been transferred to the lower support 36. The first rod 96A of the first cylinder 42A and the second rod 96B of the second cylinder 42B are in the completely retracted state in FIG. 14. Accordingly, the right ends of the lower support 36 extend approximately to the right end of the second cutting head 124. This prevents the lower support 36 from interfering with the falling of the pieces of meat 30. Similarly, the leftmost ends of the upper support 38 terminate proximate to the left side of the first cutting head 28 so as not to interfere with the transfer of the meat 26 from the dispensing roller 52 to the lower support 36.

While it is preferable that the apparatus 20 be operated using only one cutting head 28, those of skill in the art will appreciate from this disclosure that the present invention is not limited to the use of only one cutting head 28. For example, 2, 3, or more cutting heads can be used to process the meat 26. The only limit to the number of cutting heads 28 that can be used with the apparatus 20 is the relative size of the meat 26 and the thickness of the individual blades 40.

Referring to FIGS. 1–14, the apparatus 20 for processing meat operates as follows. Meat products, such as hot dogs, 26 are loaded into the hopper 46 and the power switch 60 is turned to the "on" position. Then, the operator selects whether the apparatus 20 will be run through only a single meat slicing operation or through continuous meat slicing operations using the single cycle or continuous cycle switch 64 located on the control unit housing 58. Once the hopper 46 is filled with hot dogs or other portions of meat 26, the power to the apparatus 20 is turned on, and the appropriate cycle has been selected, the operator presses the start button 62.

Once the control unit 66 determines that the start button 62 has been depressed, the third rod 96C is extended from the third cylinder 42C to rotate the dispensing roller 52 into the first position to receive a single hot dog or other meat 26 from the hopper 46. Once the dispensing roller is properly positioned, the third sensor 86C sends a first-position-roller-signal to the control unit 66. When the control unit 66 receives the first-position-roller-signal, the control unit 66 causes the third rod 96C to be retracted and thus, rotates the dispensing roller 52 and the single hot dog or other meat 26 contained therein (which was received from the hopper 46 while the dispensing roller 52 was in the first position) into the second position. Once the dispensing roller 52 is in the second position, the single hot dog or other meat 26 falls from the dispensing roller 52 and lands on the lower support 36 of the carriage 34. Once the third rod 96C is retracted into a position which corresponds to the dispensing roller 52 being in the second position, the third sensor 86C sends a second-position-roller-signal to the control unit 66.

The preferred embodiment of the third sensor 86C (and the first and second sensors 86A, 86B which are further detailed herein) is a magnetic reed switch. The magnetic reed switches are positioned on the outside of the first through third cylinders 42A–42C and are used to determine when a magnet that is contained in the rods of the cylinders is proximate to the sensor position. However, those of skill in the art will appreciate from this disclosure that the present invention is not limited to any particular type of sensor that is used with the apparatus 20.

Figure 4:
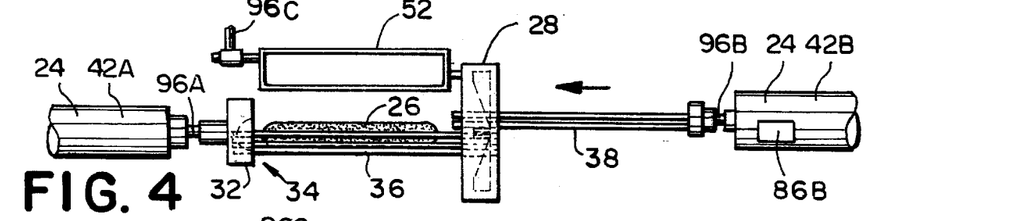
FIG. 4 is a front elevational view of a portion of the apparatus of FIG. 1 illustrating the meat overlying the lower support of the carriage as an upper support of the carriage extends leftwardly over the meat.
Figure 5:
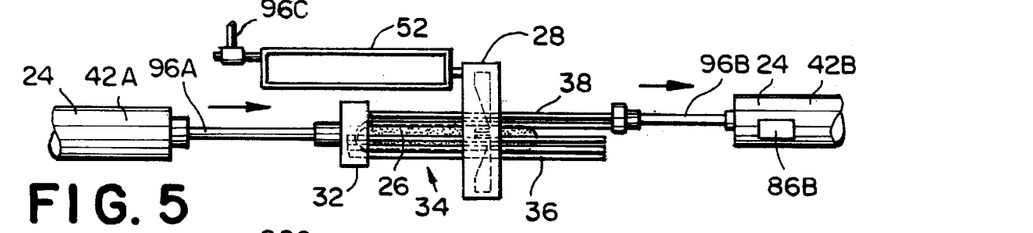
FIG. 5 is a front elevational view of a portion of the apparatus of FIG. 1 as the carriage forces the meat through a cutting head.

Once the control unit 66 receives the second-position-roller-signal indicating that the single hot dog or other meat 26 has been transferred to the lower support 36 of the carriage 34, the control unit 66 extends the second rod 96B to push the upper support 38 of the carriage 34 leftwardly to cover and hold the single hot dog or other meat 26 as shown in FIGS. 4 and 14. Once the upper support 38 is completely extended over the lower support 36, a second sensor 86B sends an extended-upper-support-signal to the control unit 66. When the control unit 66 receives the extended-upper-support-signal, the control unit 66 extends the first rod 96A rightwardly and retracts the second rod 96B to force the single hot dog or other meat 26 which is effectively held in place between the upper support 38 and the lower support 36 through the bore 106 of the cutting head 28 while maintaining the enclosure of the single hot dog or other meat 26 between the lower support 36 and the upper support 38 as shown in FIG. 5. As the hot dog or other meat 26 passes through the cutting head 28 the single hot dog or other meat 26 is cut or sliced into the meat pieces or slices 30. As described above, the apparatus 20 of the present invention preferably generates meat pieces that are used to form the product disclosed in U.S. patent application Ser. No. 09/153,107 filed Sep. 15, 1998 which is hereby incorporated by reference in its entirety.

Figures 6, 7:
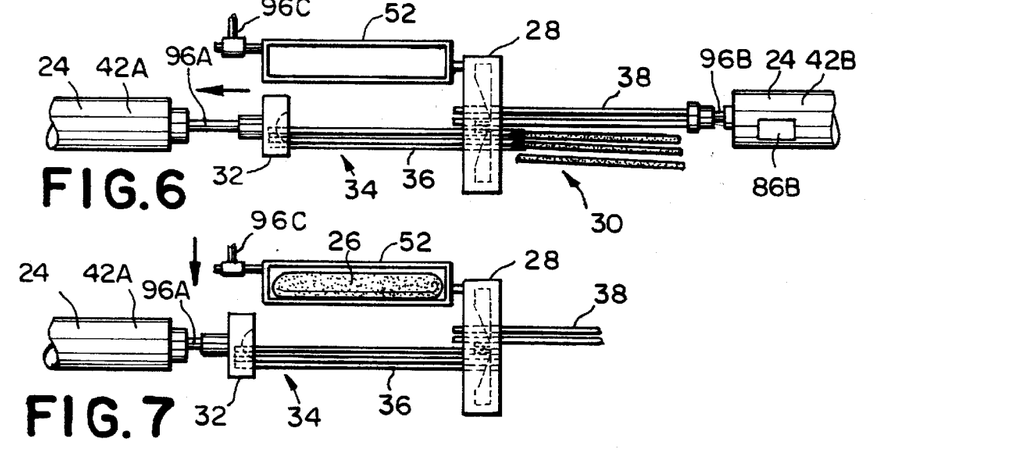
FIG. 6 is a front elevational view of a portion of the apparatus of FIG. 1 after the meat has been forced completely through the cutting head and the lower support of the carriage has been retracted leftwardly to cause the pieces of meat to fall from the carriage.
FIG. 7 is a front elevational view of a portion of the apparatus of FIG. 1 returned to the position shown in FIG. 3 in preparation for receiving the next portion of meat.

Once the first rod 96A is completely extended (and thus, the single hot dog or other meat 26 completely sliced), the first sensor 86A sends an extended-lower-support-signal to the control unit 66. When the control unit 66 receives the extended-lower-support-signal, the control unit 66 retracts the first rod 96A to move the lower support 36 leftwardly which causes the pieces of single hot dog or other meat 30 to fall from the carriage 34 as shown in FIG. 6. The lower support 36 is then ready for receiving the next hot dog or other meat 26 as shown in FIG. 7.

The particular signals and control method used with the apparatus 20 is exemplary only and, accordingly, the apparatus 20 is not limited to the preferred control method described above. Many alternative methods of controlling the apparatus 20 would be within the gambit of one skilled in the art when considered in combination with the disclosure.

It is recognized by those skilled in the art, that changes may be made to the above-described embodiments of the invention without departing from the broad inventive concept thereof. It is understood, therefore, that this invention is not limited to the particular embodiments disclosed, but is intended to cover all modifications which are within the spirit and scope of the invention as defined by the appended claims.

I claim:

1. An apparatus for processing meat, the apparatus comprising:
 a frame;
 a driving mechanism attached to the frame;
 a carriage attached to the driving mechanism and movable along a path, at least a portion of the carriage extending under substantially the entire length of the meat, as measured along the path, to receive and support the meat; and
 a stationary cutting head disposed along the path to cut the meat into at least two pieces of meat when the driving mechanism forces the meat supported by the carriage through the cutting head.

2. An apparatus for processing meat, the apparatus comprising:
 a frame;
 a driving mechanism attached to the frame;
 a carriage attached to the driving mechanism and movable along a path, the carriage adapted to receive and support the meat, wherein the carriage includes a plate forming an end of the carriage and a first plurality of bars each having one end attached to the plate to form a lower support for the meat; and
 a cutting head disposed along the path to cut the meat into at least two pieces of meat when the driving mechanism forces the meat supported by the carriage through the cutting head.

3. The apparatus of claim 2, wherein the carriage includes a second plurality of bars extendable over the lower support to form an upper support for the meat.

4. The apparatus of claim 3, wherein the cutting head detachably supports at least one blade and is adapted to be penetrated by the first plurality of bars and the second plurality of bars of the carriage.

5. The apparatus of claim 4, wherein the cutting head detachably supports six blades each having an end disposed proximate to a center of the cutting head.

6. The apparatus of claim 4, wherein the cutting head detachably supports eight blades each having an end disposed proximate to a center of the cutting head.

7. The apparatus of claim 3, wherein the driving mechanism comprises:
 a first cylinder attached to the frame and having an end attached to the lower support of the carriage to reciprocatingly drive the lower support along the path; and
 a second cylinder attached to the frame and having an end attached to the upper support of the carriage to reciprocatingly drive the upper support along the path.

8. The apparatus of claim 7, wherein the first cylinder and the second cylinder are each a pneumatic cylinder.

9. The apparatus of claim 7, further comprising a control unit for controlling the motion of the first cylinder and the second cylinder.

10. The apparatus of claim 7, wherein the control unit includes a microprocessor.

11. An apparatus for processing meat, the apparatus comprising:
 a frame;
 a driving mechanism attached to the frame;
 a carriage attached to the driving mechanism and movable along a path, the carriage adapted to receive and support the meat;
 a cutting head disposed along the path to cut the meat into at least two pieces of meat when the driving mechanism forces the meat supported by the carriage through the cutting head;
 a hopper attached to the frame for supporting multiple meats to be processed;
 a dispensing roller rotatably mounted to the frame and adapted to, while in a first position, receive meat from the hopper and also adapted to, while in a second position, transfer the meat to the carriage; and
 a cylinder attached to the frame and adapted to rotate the dispensing roller between the first and second positions.

12. The apparatus of claim 11, further comprising a conveyor beneath a portion of the path to receive the cut pieces of meat.

13. The apparatus of claim 12, wherein the conveyor is a vibratory conveyor.

14. An apparatus for processing meat, the apparatus comprising:
 a frame;
 a driving mechanism attached to the frame;
 a carriage attached to the driving mechanism and movable along a path, the carriage adapted to receive and support the meat;
 a cutting head disposed along the path to cut the meat into at least two pieces of meat when the driving mechanism forces the meat supported by the carriage through the cutting head; and
 a second cutting head co-aligned with the cutting head along the path to increase a number of pieces of meat generated by the forcing of the meat through the cutting head and the second cutting head by the drive mechanism.

15. The apparatus of claim 1, wherein the carriage includes:
 a plate forming an end of the carriage; and
 a base plate bearing at least one slot and attached to the plate to form a lower support for the meat.

16. The apparatus of claim 15, wherein the carriage includes a top plate positionable above the base plate and bearing at least one slot.

17. The apparatus of claim 4, wherein the cutting head detachably supports six blades.

18. The apparatus of claim 4, wherein the cutting head detachably supports eight blades.

* * * * *